(12) United States Patent
Manzen

(10) Patent No.: US 7,152,015 B2
(45) Date of Patent: Dec. 19, 2006

(54) TERMINAL WITH POSITION-MEASURING FUNCTIONS

(75) Inventor: Yoshihisa Manzen, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/872,546

(22) Filed: Jun. 22, 2004

(65) Prior Publication Data

US 2004/0267495 A1    Dec. 30, 2004

(30) Foreign Application Priority Data

Jun. 24, 2003    (JP)    ............... 2003-180341

(51) Int. Cl.
  *G01C 9/00*    (2006.01)
  *G01C 21/26*    (2006.01)

(52) U.S. Cl. ..................... 702/150; 701/214

(58) Field of Classification Search ............... 702/150; 701/207, 213, 214; 342/357.06, 357.12; 455/456.1

See application file for complete search history.

(56) References Cited

U.S. PATENT DOCUMENTS

| | | | |
|---|---|---|---|
| 3,936,663 A | | 2/1976 | Taylor et al. |
| 4,812,991 A | * | 3/1989 | Hatch ........................ 701/225 |
| 4,837,700 A | * | 6/1989 | Ando et al. ................. 701/213 |
| 5,252,982 A | * | 10/1993 | Frei ....................... 342/357.03 |
| 5,337,243 A | * | 8/1994 | Shibata et al. ............... 701/214 |
| 5,390,125 A | * | 2/1995 | Sennott et al. .............. 701/214 |
| 5,463,553 A | * | 10/1995 | Araki et al. ................. 701/208 |
| 5,506,774 A | * | 4/1996 | Nobe et al. ................. 701/213 |
| 5,598,166 A | * | 1/1997 | Ishikawa et al. ........ 342/357.06 |
| 5,740,048 A | * | 4/1998 | Abel et al. .................. 701/200 |
| 5,955,973 A | * | 9/1999 | Anderson ................... 340/988 |
| 6,081,230 A | * | 6/2000 | Hoshino et al. ........ 342/357.06 |
| 6,535,833 B1 | * | 3/2003 | Syrjarinne ................... 702/150 |
| 6,574,557 B1 | * | 6/2003 | Endo ........................... 701/213 |
| 6,597,985 B1 | * | 7/2003 | Toyooka ...................... 701/207 |
| 6,618,690 B1 | * | 9/2003 | Syrjarinne ................... 702/179 |

FOREIGN PATENT DOCUMENTS

| | | |
|---|---|---|
| GB | 1 348 000 A | 2/1974 |
| JP | 63-109381 | 5/1988 |
| JP | 63-109381 A | 9/1988 |
| JP | 63-282676 | 11/1988 |
| JP | 63-282676 A | 11/1988 |
| JP | 5-231866 | 9/1993 |
| JP | 05-231866 A | 9/1993 |
| JP | 2543050 | 7/1996 |
| JP | 8-271607 | 10/1996 |
| JP | 2003121528 A * | 4/2003 |

* cited by examiner

*Primary Examiner*—Bryan Bui
*Assistant Examiner*—Toan M. Le
(74) *Attorney, Agent, or Firm*—Foley & Lardner LLP

(57) ABSTRACT

A terminal with position-measuring functions is provided which is capable of improving position-measuring accuracy. The terminal with position-measuring functions includes a position-measuring section, a statistical processing section, and a position-information application section. The statistical processing section, in first position-measuring calculation, outputs a measured result obtained from the first position-measuring operation as it is, and, when position-measuring calculations have been performed at least two times and at most (m−1) times ("m" is a natural number being 3 or more), the statistical processing section outputs an average value of measured results obtained from position-measuring operations performed at least two times and at most (m−1) times, and, when position-measuring calculations have been performed "m" times or more, the statistical processing section outputs an average value of measured results obtained from position-measuring operations performed (n−m+1)-th to n-th time ("n" is a natural number being "m" or more).

10 Claims, 7 Drawing Sheets

TERMINAL WITH POSITION-MEASURING FUNCTIONS

BACKGROUND OF THE INVENTION

1. Field of the Invention

The present invention relates to a terminal with position-measuring functions, which is capable of improving position-measuring accuracy by performing statistical processing.

The present application claims priority of Japanese Patent Application No. 2003-180341 filed on Jun. 24, 2003, which is hereby incorporated by reference.

2. Description of the Related Art

In recent years, a system and product such as a car navigation system using information about a position fed from a GPS (Global Positioning System) or a like are becoming available rapidly and increasingly. Generally, important factors constituting such the position-measuring functions include sensitivity, accuracy, and time required for measurement. Especially, in a navigation system, a required important function is to be able to obtain accurate information about a present position and, therefore, improvement in measuring accuracy is necessary.

FIG. 8 is a block diagram for showing an example of configurations of a conventional terminal with position-measuring functions, which chiefly includes a position-measuring section 11 and position-information application section 12, as disclosed in Patent Reference Nos. 1 to 5 listed below. The position-measuring section 11 measures a position of a terminal. The position-information application section 12, based on a result from the position measurement fed from the position-measuring section 11, performs processing on position information so that it has a form that can be used by a user and outputs it.

FIG. 9 is a sequence diagram explaining operations of the conventional terminal with position-measuring functions shown in FIG. 8. The operations of the conventional terminal with position-measuring functions are described by referring to FIGS. 8 and 9. The position-measuring section 11, by using a GPS and/or position-measuring technology such as a network position-measuring method or a like, obtains data on a present position of a terminal and sequentially outputs position-measured results "1" to "n" to the position-information application section 12. The position-information application section 12, when receiving the position-measured results "1" to "n", performs processing on the results so that they have forms that can be used by a user, for example, they are displayed as a map or as information related to the position.

Patent References:

Ref. No. 1: Japanese Patent Application Laid-open No. Sho63-109381

Ref. No. 2: Japanese Patent Application Laid-open No. Sho63-282676

Ref. No. 3: Japanese Patent Application Laid-open No. Hei05-231866

Ref. No. 4: Japanese Patent Application Laid-open No. Hei08-271607

Ref. No. 5: Japanese Patent No. 2543050

The conventional terminal with position-measuring functions shown in FIG. 8 has a problem in that position information output based on position-measured results "1" to "n" obtained by the position-measuring section 11 has variations, relative to its original exact position, caused by environmental conditions or a like occurring at time of the position measurement.

SUMMARY OF THE INVENTION

In view of the above, it is an object of the present invention to provide a terminal with position-measuring functions which is capable of improving apparent position-measuring accuracy by performing statistical processing on measured results obtained by a position-measuring section.

According to a first aspect of the present invention, there is provided a terminal with position-measuring functions including:

a position-measuring unit to output a position-measured result, which is obtained using arbitrary position-measuring technology, corresponding to a present position of the terminal;

a statistical processing unit to perform statistical processing on the position-measured result in accordance with a preset statistical processing procedure, and to output position information obtained as a result of the statistical processing; and a position application unit to output the position information obtained as the result of the statistical processing in a manner to correspond to a preset application;

wherein, in first position-measuring calculation, the statistical processing unit outputs a measured result obtained from the first position-measuring operation as it is, and, when position-measuring calculations have been performed at least two times and at most (m−1) times ("m" is a natural number being 3 or more), the statistical processing unit outputs an average value of measured results obtained from position-measuring operations performed at least two times and at most (m−1) times, and, when position-measuring calculations have been performed "m" times or more, the statistical processing unit outputs an average value of measured results obtained from position-measuring operations performed (n−m+1)-th to n-th time ("n" is a natural number being "m" or more).

According to a second aspect of the present invention, there is provided a terminal with position-measuring functions including:

a position-measuring unit to output a position-measured result, which is obtained using arbitrary position-measuring technology, corresponding to a present position of the terminal;

a statistical processing unit to perform statistical processing on the position-measured result in accordance with a preset statistical processing procedure, and to output position information obtained as a result of the statistical processing; and a position application unit to output the position information obtained as the result of the statistical processing in a manner to correspond to a preset application;

wherein the statistical processing unit outputs an average value of all position-measured results obtained in a past.

In the foregoing first and second aspects, a preferable mode is one wherein, when a failure occurs in position-measurement, an average value of position-measured results from which failed position-measured results are excluded is output.

Also, a preferable mode is one wherein the statistical processing unit, when detecting that a specified speed is exceeded due to movement of the terminal, automatically stops pre-determined processing and outputs a measured result as it is.

According to a third aspect of the present invention, there is provided a terminal with position-measuring functions including:

a position-measuring unit to output a position-measured result, which is obtained using arbitrary position-measuring technology, corresponding to a present position of the terminal;

a statistical processing unit to perform statistical processing on the position-measured result in accordance with a preset statistical processing procedure, and to output position information obtained as a result of the statistical processing; and a position application unit to output the position information obtained as the result of the statistical processing in a manner to correspond to a preset application;

wherein, in first position-measuring calculation, the statistical processing unit outputs a measured result obtained from the first position-measuring operation as it is, and, when position-measuring calculations have been performed at least two times and at most (m−1) times ("m" is a natural number being 3 or more), the statistical processing unit outputs a position-measured result having a minimum position-measured error out of measured results obtained from position-measuring operations performed at least two times and at most (m−1) times , and, when position-measuring calculations have been performed "m" times or more, the statistical processing unit outputs a position-measured result having a minimum position-measured error out of measured results obtained from position-measuring operations performed (n−m+1)-th to n-th time ("n" is a natural number being "m" or more).

According to a fourth aspect of the present invention, there is provided a terminal with position-measuring functions including:

a position-measuring unit to output a position-measured result, which is obtained using arbitrary position-measuring technology, corresponding to a present position of the terminal;

a statistical processing unit to perform statistical processing on the position-measured result in accordance with a preset statistical processing procedure, and to output position information obtained as a result of the statistical processing; and a position application unit to output the position information obtained as the result of the statistical processing in a manner to correspond to a preset application;

wherein, in first position-measuring calculation, the statistical processing unit outputs a measured result obtained from the first position-measuring operation as it is, and, when position-measuring calculations have been performed at least two times and at most (m−1) times ("m" is a natural number being 3 or more), the statistical processing unit outputs a position-measured result having a minimum position-measured error out of measured results obtained from position-measuring operations performed at least two times and at most (m−1) times , and, when position-measuring calculations have been performed "m" times or more, the statistical processing unit outputs a position-measured result having a minimum position-measured error out of measured results obtained from position-measuring operations performed (n−m+1)-th to n-th time ("n" is a natural number being "m" or more).

In the foregoing third and fourth aspects, a preferable mode is one wherein, when a failure occurs in position-measurement, a position-measured result having a minimum position-measured error out of position-measured results from which failed position-measured results are excluded is output.

Also, a preferable mode is one wherein the statistical processing unit, when detecting that a specified speed is exceeded due to movement of the terminal, automatically stops pre-determined processing and outputs a measured result as it is.

With the above configuration, a average position or a position having a minimum error is calculated by performing statistical processing on results from measurement made two or more times in the past or on all position-measured results obtained in the past and, therefore, position-measuring accuracy is improved. Moreover, since, even when the terminal with position-measuring functions moves, the statistical processing is automatically stopped when detecting an overspeed caused by the movement of the terminal, degradation in position-measuring accuracy can be prevented.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
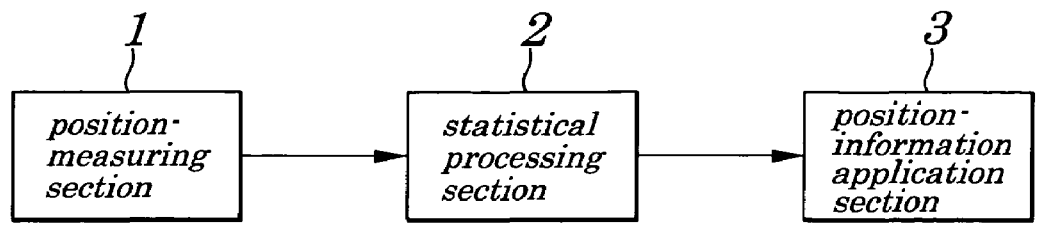
FIG. 1 is a block diagram showing configurations of a terminal with position-measuring functions according to a first embodiment of the present invention.
Figure 2:
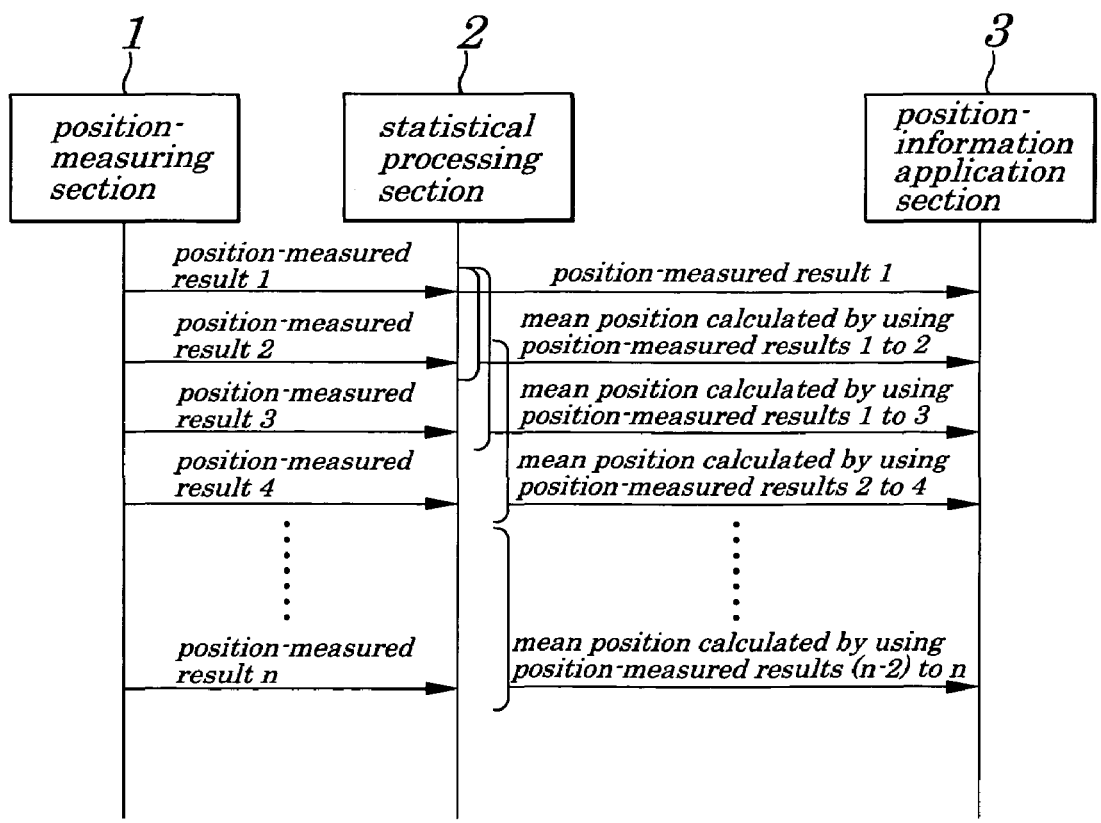
FIG. 2 is a sequence diagram explaining a processing method to be performed by a statistical processing section in the terminal with position-measuring functions according to the first embodiment of the present invention.
Figure 3:
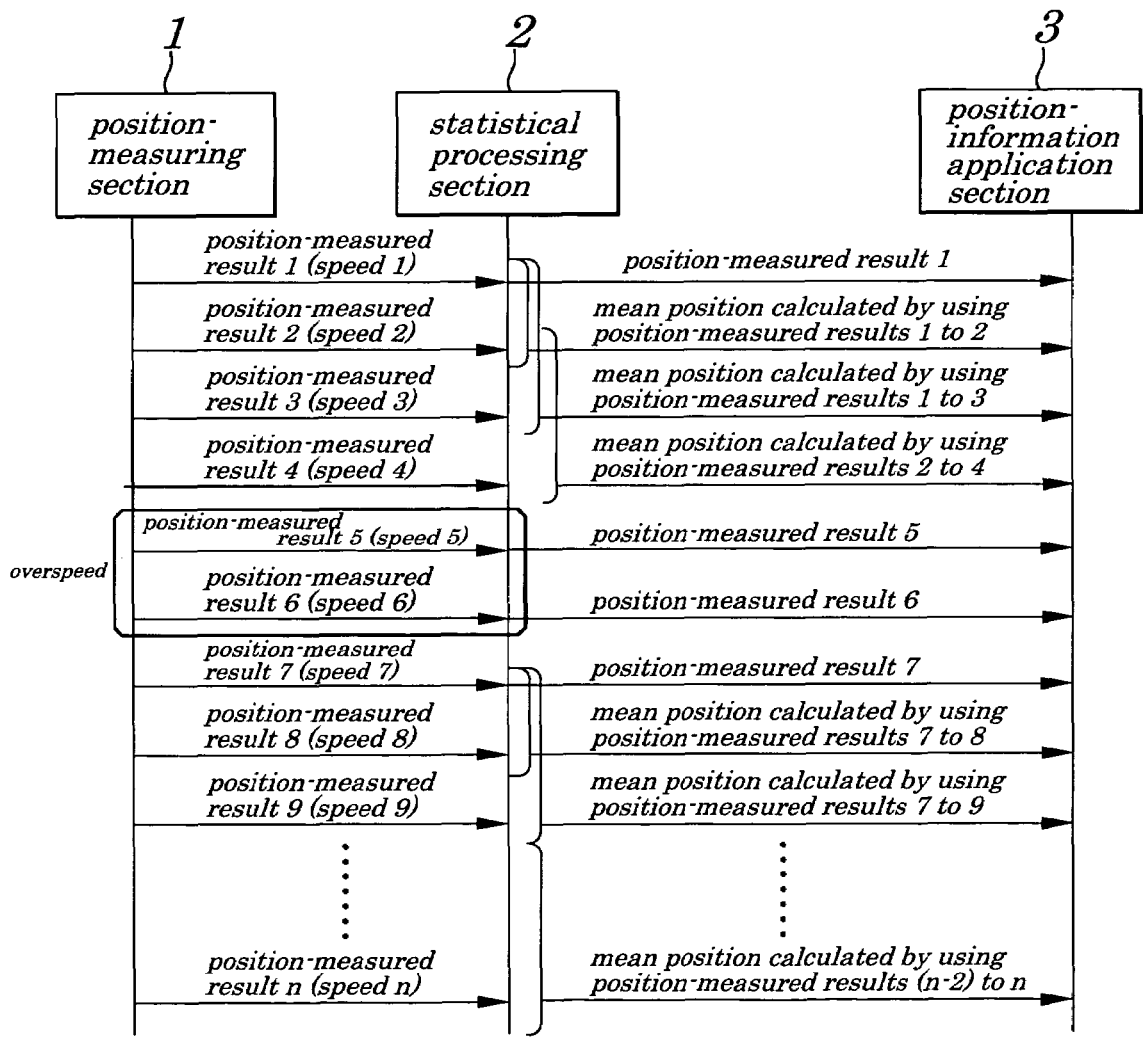
FIG. 3 is a sequence diagram showing an example of operations to be performed when results output from a position-measuring section are output, as they are, to a position information application section, when an overspeed caused by movement of the terminal is detected according to the first embodiment of the present invention.
Figure 4:
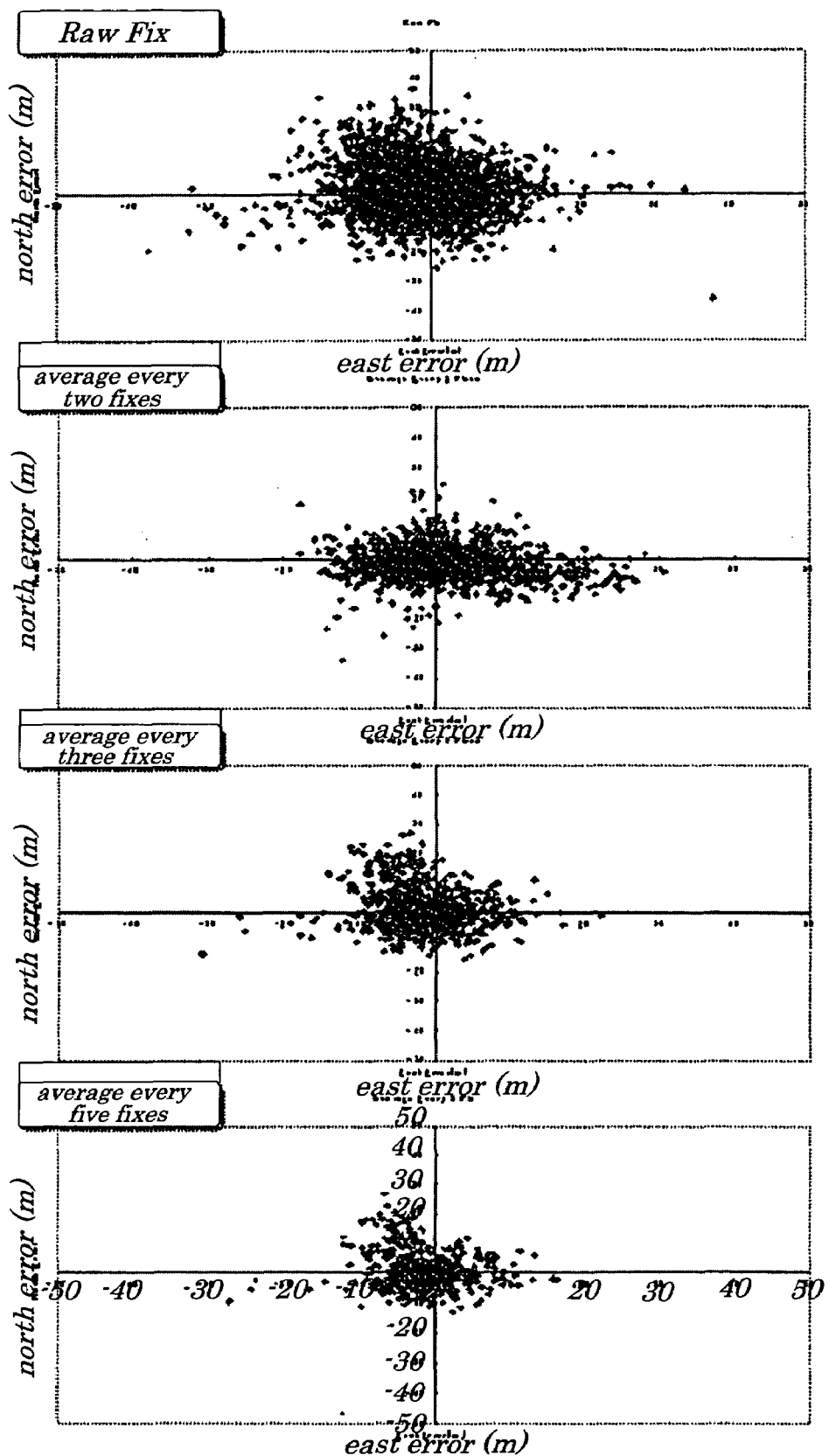
FIG. 4 is a diagram showing data representing effectiveness of a position-measuring method employed in the first embodiment of the present invention.

FIG. 1 is a block diagram showing configurations of a terminal with position-measuring functions according to a first embodiment of the present invention. FIG. 2 is a sequence diagram explaining a processing method to be performed by a statistical processing section in the terminal with position-measuring functions according to the first embodiment. FIG. 3 is a sequence diagram showing an example of operations to be performed when results output from a position-measuring section are output, as they are, to a position information application section, when an overspeed caused by movement of the terminal is detected according to the first embodiment. FIG. 4 is a diagram showing data representing effectiveness of the position-measuring method employed in the first embodiment.

The terminal with position-measuring functions of the embodiment, as shown in FIG. 1, chiefly includes a position-measuring section 1, a statistical processing section 2, and a position-information application section 3. The position-measuring section 1, by using a GPS and/or position-measuring technology such as a network position-measuring method or a like, obtains data on a present position of the terminal and sequentially outputs position-measured results "1" to "n" to the statistical processing section 2. The statistical processing section 2 performs statistical processing on position-measured results "1" to "n" based on a preset statistical process and outputs position information resulting from the statistical processing to the position-information application section 3. The position-information application section 3 displays position information input from the statistical processing section 2 as a map or a like in a form that can be understood by a user and/or outputs it as data in a form that can be understood by the user.

Processing to be performed by the statistical processing section 2 employed in the terminal with position-measuring functions of the embodiment is described in detail by referring to FIGS. 1 and 2. FIG. 2 shows an example in which an average position to be obtained by results from three times' measurements in the past is calculated by using three recently-measured results of the measured results "1" to "n" output by the position-measuring section 1. As shown in FIG. 2, if the number of times of position-measurement (fix) is less than "3", the statistical processing section 2, in the first calculation of an average position at a time when the number of times of position-measurement is "1", outputs the position-measured result "1" as it is and the statistical processing section 2, in the second calculation of an average position at a time when the number of times of position-measurement is "2", calculates an average position by using the measured results 1 and 2 and outputs the calculated average position. As shown in FIG. 2, if the number of times of position-measurement is "3" or more, the statistical processing section 2, in the third calculation of an average position at a time when the number of times of position-measurement is "3", calculates an average position by using the measured results 1, 2, and 3 and outputs the calculated average position. Thereafter, similarly, in the n-th calculation of an average position at a time when the number of times of position-measurement is "n" ("n" is a natural number being "4" or more), the statistical processing section 2 calculates an average position by using the measured results "(n−2)" to "n" and outputs the calculated average position.

Data on measured results output from the position-measuring section 1 is not always valid and failure may occur in the position-measurement in some cases. In such the cases, when an average position is to be calculated by using results from three times' position-measuring operations, two methods are available. One method is to calculate an average position by using all the three measured results including the result from the failed measurement, that is, by using two valid position-measured results and one invalid position-measured result. Another method is to calculate an average position by using two valid position-measured results only, except for one invalid position-measured result. Still another method is that no processing of calculating an average position is performed until valid three position-measured results become available.

Generally, the method for improving position-measuring accuracy by performing statistical processing on measured results obtained in the past is effective when a position to be measured is a fixed point, that is, the position to be measured is not in a moving state. Therefore, in a case where the terminal with position-measuring functions moves, it is desirable that a position-measured result fed from the position-measuring section 1 is output as it is, without performing statistical processing, to the position-information application section 3.

FIG. 3 shows an example in which a result fed from the position-measuring section 1 is output as it is, without performing statistical processing, when an overspeed caused by speedy movement of the terminal is detected, to the position-information application section 3. As shown in FIG. 3, the statistical processing section 2, since a speed 5 in the position-measured result 5 and a speed 6 in the position-measured result 6 exceed a predetermined speed, automatically stops its statistical processing and, therefore, outputs, without performing the statistical processing, the position-measured results 5 and 6, as they are, to the position-information application section 3.

FIG. 4 shows diagrams explaining effectiveness of the position-measuring method employed in the terminal with position-measuring functions of the first embodiment, which indicate that a distribution of position-measuring accuracy converges more by an increase in numbers of times of averaging processes. In the example, the distribution of variations in position-measured results obtained by performing "average every two fixes", "average every three fixes", and "average every five fixes", on position-measured results at a fixed point is shown, which shows a tendency in which the variations in the position-measured results decrease as the number of times of averaging processes increases.

Thus, in the terminal with position-measuring functions of the first embodiment, since an average position is calculated by performing statistical processing on results from two or more times' measuring operations in the past, position-measuring accuracy can be improved. Moreover, since, even when the terminal with position-measuring functions moves, the statistical processing is automatically stopped, when an overspeed caused by the speedy movement of the terminal is detected, degradation in position-measuring accuracy can be prevented.

Second Embodiment

Figure 5:
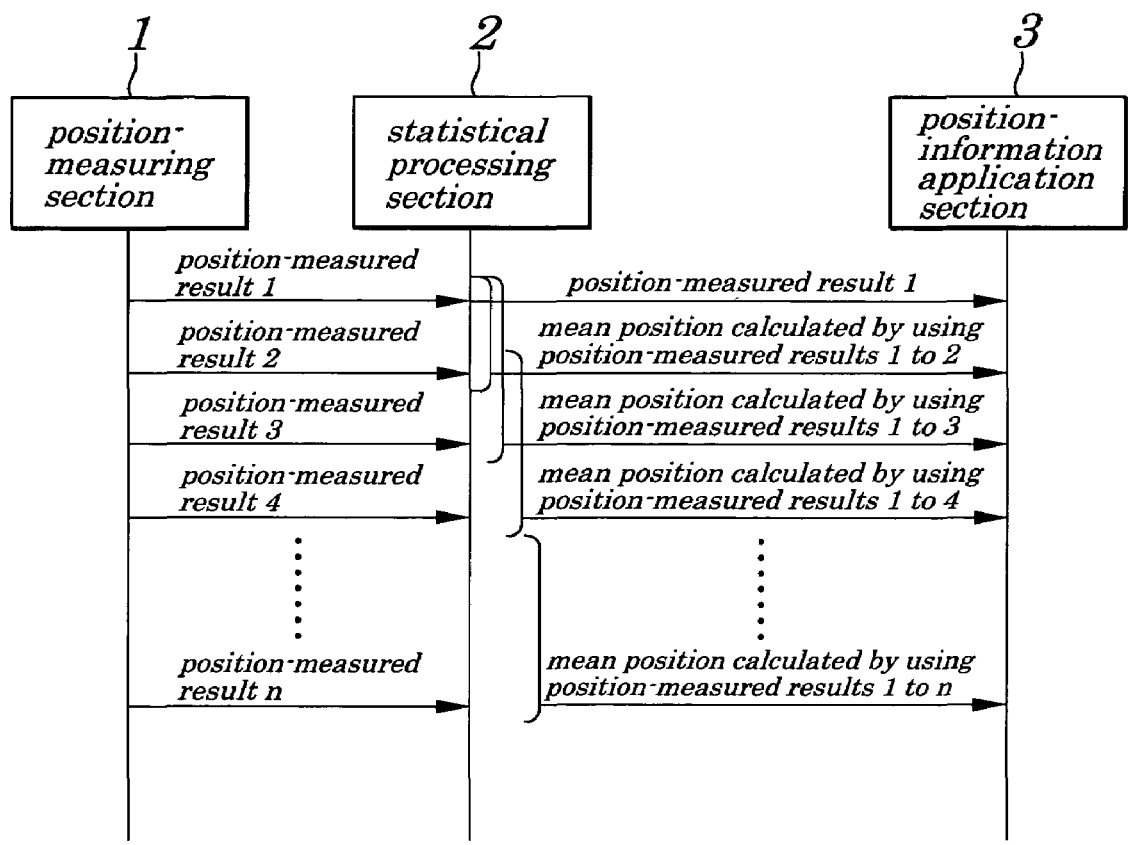
FIG. 5 is a sequence diagram explaining a processing method to be performed by a statistical processing section employed in the terminal with position-measuring functions of a second embodiment of the present invention.

FIG. 5 is a sequence diagram explaining a processing method to be performed by a statistical processing section employed in the terminal with position-measuring functions of a second embodiment of the present invention. Configurations of the terminal with position-measuring functions of the second embodiment are the same as those in the first embodiment shown in FIG. 1.

However, operations to be performed by the terminal with position-measuring functions of the second embodiment differ from those in the first embodiment shown in FIGS. 2 and 3 in that a statistical processing section of the second embodiment calculates an average position by using all position-measured results obtained in the past. Unlike in the case of the first embodiment shown in FIGS. 2 and 3 in which an average position is calculated by limiting the number of position-measured results obtained in the past to be used for the calculation, in the second embodiment, as shown in FIG. 5, an average position is calculated by using all the position-measured results obtained in the past and, therefore, the larger the number of the position-measuring operations become, the smaller the variations in the average position calculated by using the position-measured results become, which, as a result, can improve position-measuring accuracy.

As in the case of the first embodiment, also in the second embodiment, degradation in position-measuring accuracy occurring at time of movement of the terminal can be prevented by employing the method applied to the occurrence of failure in the position-measuring section 1 and by automatically stopping statistical processing when an overspeed is detected.

Thus, according to the terminal with position-measuring functions of the second embodiment, same effects obtained in the first embodiment can be achieved and additionally position-measuring accuracy can be further improved.

Third Embodiment

Figure 6:
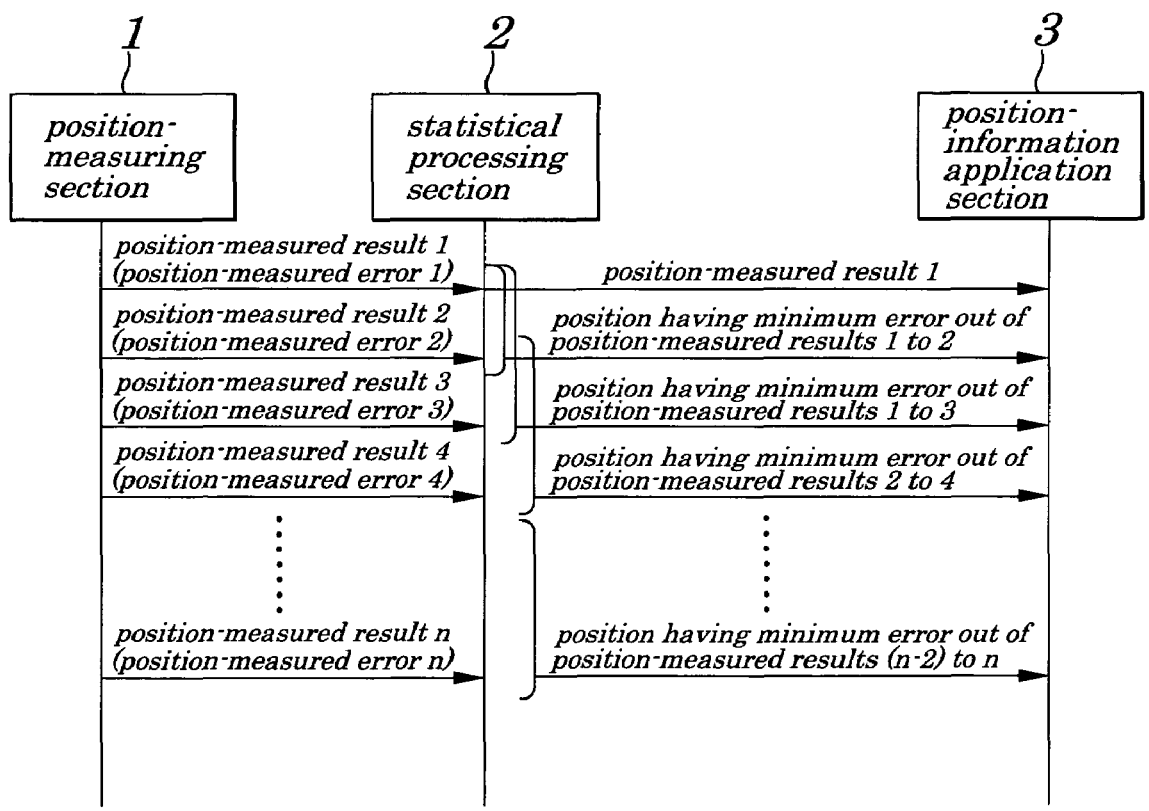
FIG. 6 is a sequence diagram showing a first processing method to be performed by a statistical processing section of a terminal with position-measuring functions according to a third embodiment of the present invention.
Figure 7:
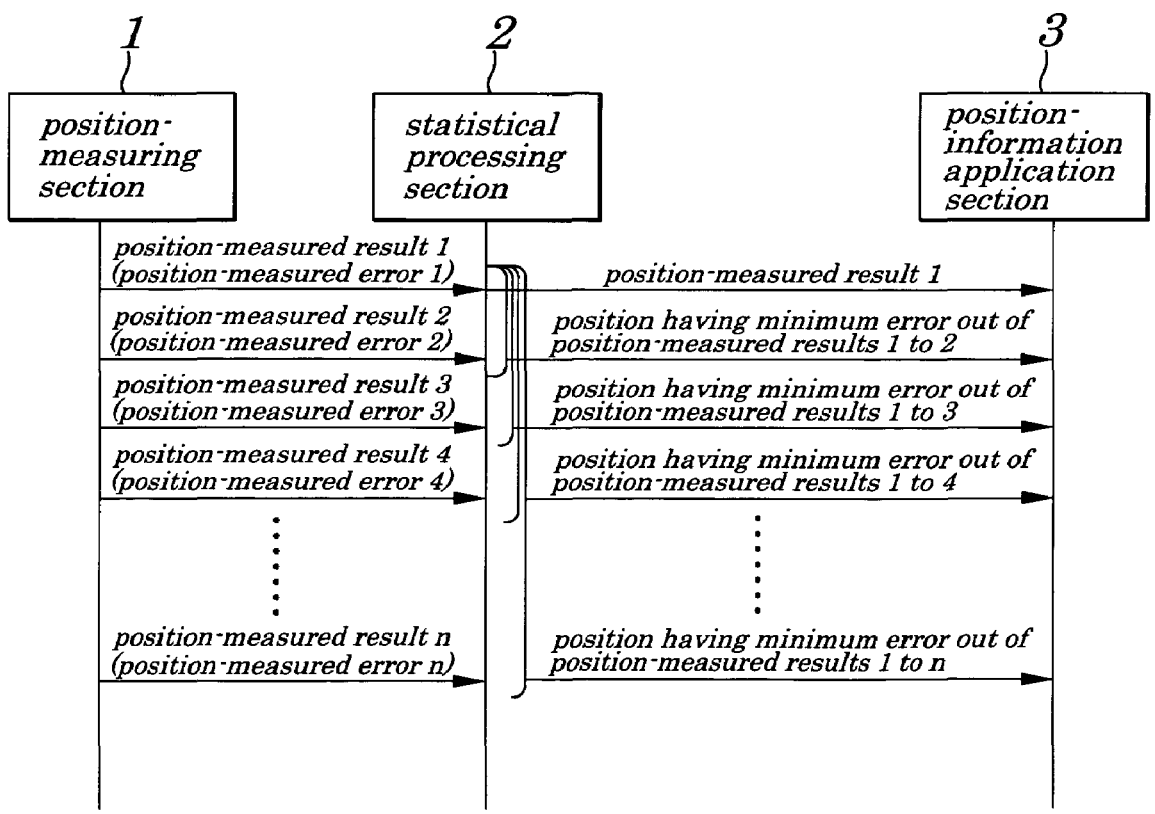
FIG. 7 is a sequence diagram showing a second processing method to be performed by the statistical processing section of the terminal with position-measuring functions according to the third embodiment of the present invention.
Figure 8:
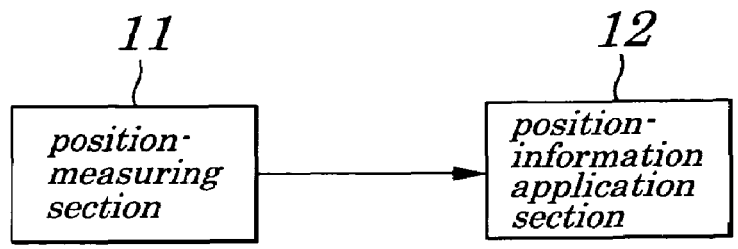
FIG. 8 is a block diagram showing an example of a configuration of a conventional terminal with position-measuring functions.
Figure 9:
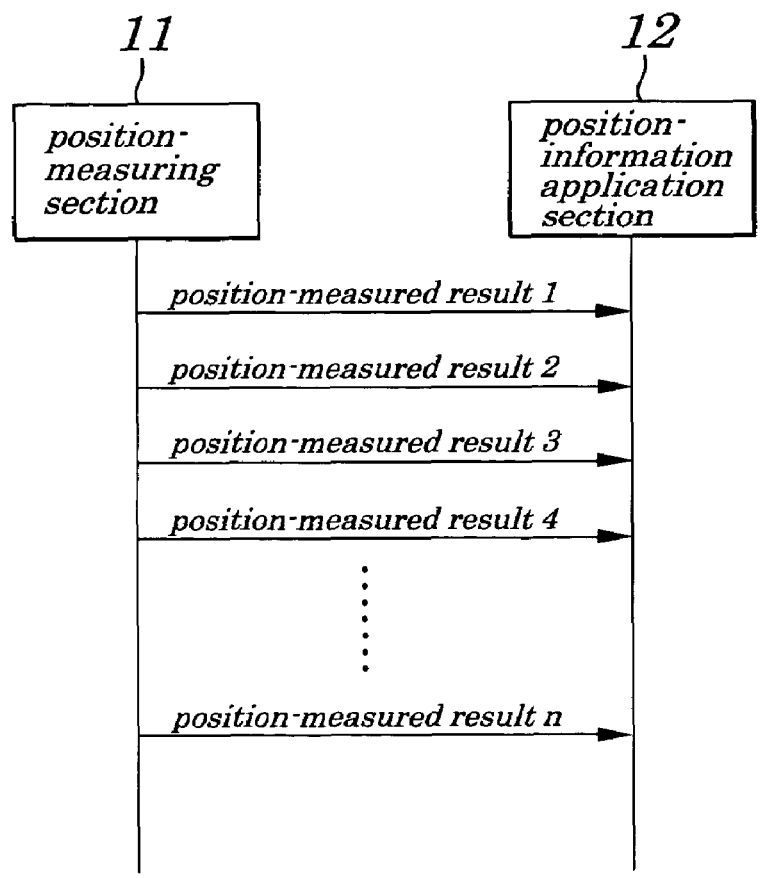
FIG. 9 is a sequence diagram explaining operations of the conventional terminal with position-measuring functions shown in FIG. 8.

FIG. 6 is a sequence diagram showing a first processing method to be performed by a statistical processing section of a terminal with position-measuring functions of a third embodiment of the present invention. FIG. 7 is a sequence diagram showing a second processing method to be performed by the statistical processing section of the terminal with position-measuring functions of the third embodiment. Configurations of the terminal with position-measuring functions of the third embodiment are the same as those in the first embodiment shown in FIG. 1.

However, operations to be performed by the terminal with position-measuring functions of the third embodiment differ from those in the first or second embodiment. That is, unlike in the case of the first and second embodiment in which the statistical processing section calculates an average position, in the third embodiment, a position having a minimum position-measured error is selected, based on a position-measured error to be obtained together with a position-measured result.

In the first processing method employed in the third embodiment, as shown in FIG. 6, a position having a minimum position-measured error is selected out of position-measured results obtained from operations performed two or more times in the past. In the example shown in FIG. 6, if the number of times of position-measurement is less than 3, the statistical processing section 2, in the first calculation of an average position, outputs the position-measured result 1 as it is and the statistical processing section 2, in the second calculation of an average position, outputs a position having a minimum error out of the position-measured results 1 and 2, and the statistical processing section 3, in the third calculation of an average position, outputs a position having a minimum error out of the position-measured results (3-2) to 3. Thereafter, similarly, in the n-th calculation of an average position, the statistical processing section 2 outputs a position having a minimum error out of the position-measured results "(n–2)" to "n".

In this case, to represent a position-measured error, in the case of, for example, a GPS, an index such as a DOP (Dilution of Precision), Ellipsoide values, or a like that indicates a position-measured error calculated in a process of position-measuring operations can be used.

In the second processing method employed in the third embodiment, as shown in FIG. 7, a position having a minimum position-measured error is selected out of all position-measured results obtained in the past. In the example shown in FIG. 7, a position having a minimum error is selected out of all the position-measured results obtained in the past and, therefore, the larger the number of the position-measuring operations become, the more position-measuring accuracy is improved.

As in the case of the first and second embodiments, also in the third embodiment, degradation in position-measuring accuracy occurring at time of movement of the terminal can be prevented by employing the method applied to the occurrence of failure in the position-measuring section 1 and by automatically stopping statistical processing when an overspeed is detected.

Thus, according to the terminal with position-measuring functions of the third embodiment, same effects as obtained in the first and second embodiment can be achieved and, additionally, since a position having a minimum error is selected, position-measuring accuracy can be more improved when compared with the case in which an average position is calculated.

It is apparent that the present invention is not limited to the above embodiments but may be changed and modified without departing from the scope and spirit of the invention. For example, in the above embodiments, as a means of position measurement used by the position-measuring section 1, a GPS or a network position-measuring method is employed, however, so long as information about a position is acquired, any means may be used. Moreover, the position information application section 3 employed in the above embodiment holds entire applications to be achieved by using general position information, which is not limited to the application in which a position is output in a map. Also, the speed obtained by operations of the position measuring section 1 is used in the first embodiment, however, the speed may be obtained by using an acceleration sensor. Furthermore, in the first and third embodiments, the number of times of position-measuring operations performed when an average position or a position having a minimum error is calculated by using measured results obtained by two or more times' measuring operations is three, however, the number of times of position-measuring operations may be arbitrary.

What is claimed is:

1. A terminal with position-measuring functions comprising:
   a position-measuring unit to output a position-measured result, which is obtained using arbitrary position-measuring technology, corresponding to a present position of said terminal when said terminal is moving and when said terminal is stationary;

a statistical processing unit to perform statistical processing on said position-measured result including position-measured result when said terminal is moving and position-measured result when said terminal is stationary, in accordance with a preset statistical processing procedure, and to output position information obtained as a result of said statistical processing; and a position application unit to output said position information obtained as said result of said statistical processing in a manner to correspond to a preset application, wherein, in first position-measuring calculation, said statistical processing unit outputs a measured result obtained from the first position-measuring operation as it is, and, when position-measuring calculations have been performed at least two times and at most (m−1) times ("m" is a natural number being 3 or more), said statistical processing unit outputs an average value of measured results obtained from position-measuring operations performed at least two times and at most (m−1) times, and, when position-measuring calculations have been performed "m" times or more, said statistical processing unit outputs an average value of measured results obtained from position-measuring operations performed (n−m+1)-th to n-th time ("n" is a natural number being "m" or more).

2. The terminal with position-measuring functions according to claim 1, wherein, when a failure occurs in position-measurement, an average value of position-measured results from which failed position-measured results are excluded is output.

3. A terminal with position-measuring functions comprising:

a position-measuring unit to output a position-measured result, which is obtained using arbitrary position-measuring technology, corresponding to a present position of said terminal;

a statistical processing unit to perform statistical processing on said position-measured result in accordance with a preset statistical processing procedure, and to output position information obtained as a result of said statistical processing; and a position application unit to output said position information obtained as said result of said statistical processing in a manner to correspond to a preset application, wherein, in first position-measuring calculation, said statistical processing unit outputs a measured result obtained from the first position-measuring operation as it is, and, when position-measuring calculations have been performed at least two times and at most (m−1) times ("m" is a natural number being 3 or more), said statistical processing unit outputs an average value of measured results obtained from position-measuring operations performed at least two times and at most (m−1) times, and, when position-measuring calculations have been performed "m" times or more, said statistical processing unit outputs an average value of measured results obtained from position-measuring operations performed (n−m+1)-th to n- th time ("n" is a natural number being "m" or more); and wherein said statistical processing unit, when detecting that a specified speed is exceeded due to movement of said terminal, automatically stops pre-determined processing and outputs a measured result as it is.

4. A terminal with position-measuring functions comprising:

a position-measuring unit to output a position-measured result, which is obtained using arbitrary position-measuring technology, corresponding to a present position of said terminal;

a statistical processing unit to perform statistical processing on said position-measured result in accordance with a preset statistical processing procedure, and to output position information obtained as a result of said statistical processing; and a position application unit to output said position information obtained as said result of said statistical processing in a manner to correspond to a preset application, wherein said statistical processing unit outputs an average value of all position- measured results obtained in a past; and wherein said statistical processing unit, when detecting that a specified speed is exceeded due to movement of said terminal, automatically stops pre-determined processing and outputs a measured result as it is.

5. A terminal with position-measuring functions comprising:

a position-measuring unit to output a position-measured result, which is obtained using arbitrary position-measuring technology, corresponding to a present position of said terminal when said terminal is moving and when said terminal is stationary;

a statistical processing unit to perform statistical processing on said position-measured result including position-measured result when said terminal is moving and position-measured result when said terminal is stationary, in accordance with a preset statistical processing procedure, and to output position information obtained as a result of said statistical processing; and a position application unit to output said position information obtained as said result of said statistical processing in a manner to correspond to a preset application, wherein, in first position-measuring calculation, said statistical processing unit outputs a measured result obtained from the first position-measuring operation as it is, and, when position-measuring calculations have been performed at least two times and at most (m−1) times ("m" is a natural number being 3 or more), said statistical processing unit outputs a position-measured result having a minimum position-measured error out of measured results obtained from position-measuring operations performed at least two times and at most (m−1) times, and, when position-measuring calculations have been performed "m" times or more, said statistical processing unit outputs a position-measured result having a minimum position-measured error out of measured results obtained from position-measuring operations performed (n−m+1)-th to n-th time ("n" is a natural number being "m" or more).

6. The terminal with position-measuring functions according to claim 5, wherein, when a failure occurs in position-measurement, a position-measured result having a minimum position-measured error out of position-measured results from which failed position-measured results are excluded is output.

7. A terminal with position-measuring functions comprising:

a position-measuring unit to output a position-measured result, which is obtained using arbitrary position-measuring technology, corresponding to a present position of said terminal;

a statistical processing unit to perform statistical processing on said position-measured in accordance with a preset statistical processing procedure, and to output position information obtained as a result of said statistical processing; and a position application unit to output said position information obtained as said result of said statistical processing in a manner to correspond to a preset application, wherein, in first position-measuring calculation, said statistical processing unit outputs a measured result obtained from the first position-measuring operation as it is, and, when position-measuring calculations have been performed at least two times and at most (m−1) times ("m" is a natural number being 3 or more), said statistical processing unit outputs a position-measured result having a minimum position-measured error out of measured results obtained from position-measuring operations performed at least two times and at most (m−1) times, and, when position-measuring calculations have been performed "m" times or more, said statistical processing unit outputs a position-measured result having a minimum position-measured error out of measured results obtained from position-measuring operations performed (n−m+1)-th to n-th time ("n" is a natural number being "m" or more); and wherein said statistical processing unit, when detecting that a specified speed is exceeded due to movement of said terminal, automatically stops pre-detennined processing and outputs a measured result as it is.

8. A terminal with position-measuring functions comprising:

a position-measuring unit to output a position-measured result, which is obtained using arbitrary position-measuring technology, corresponding to a present position of said terminal;

a statistical processing unit to perform statistical processing on said position-measured result in accordance with a preset statistical processing procedure, and to output position information obtained as a result of said statistical processing; and a position application unit to output said position information obtained as said result of said statistical processing in a manner to correspond to a preset application, wherein said statistical processing unit outputs a position-measured result having a minimum position-measured error out of all position-measured results obtained in a past; and wherein said statistical processing unit, when detecting that a specified speed is exceeded due to movement of said terminal, automatically stops pre-determined processing and outputs a measured result as it is.

9. A terminal with position-measuring functions comprising:

a position-measuring means to output a position-measured result, which is obtained using arbitrary position-measuring technology, corresponding to a present position of said terminal when said terminal is moving and when said terminal is stationary;

a statistical processing means to perform statistical processing on said position-measured result including position-measured result when said terminal is moving and position-measured result when said terminal is stationary, in accordance with a preset statistical processing procedure, and to output position information obtained as a result of said statistical processing; and a position application means to output said position information obtained as said result of said statistical processing in a manner to correspond to a preset application, wherein, in first position-measuring calculation, said statistical processing means outputs a measured result obtained from the first position-measuring operation as it is, and, when position-measuring calculations have been performed at least two times and at most (m−1) times ("m" is a natural number being 3 or more), said statistical processing means outputs an average value of measured results obtained from position-measuring operations performed at least two times and at most (m−1) times, and, when position-measuring calculations have been performed "m" times or more, said statistical processing means outputs an average value of measured results obtained from position-measuring operations performed (n−m+1)-th to n- th time ("n" is a natural number being "m" or more).

10. A terminal with position-measuring functions comprising:

a position-measuring means to output a position-measured result, which is obtained using arbitrary position-measuring technology, corresponding to a present position of said terminal when said terminal is moving and when said terminal is stationary;

a statistical processing means to perform statistical processing on said position-measured result including position-measured result when said terminal is moving and position-measured result when said terminal is stationary, in accordance with a preset statistical processing procedure, and to output position information obtained as a result of said statistical processing; and a position application means to output said position information obtained as said result of said statistical processing in a manner to correspond to a preset application, wherein, in first position-measuring calculation, said statistical processing means outputs a measured result obtained from the first position-measuring operation as it is, and, when position-measuring calculations have been performed at least two times and at most (m−1) times ("m" is a natural number being 3 or more), said statistical processing means outputs a position-measured result having a minimum position-measured error out of measured results obtained from position-measuring operations performed at least two times and at most (m−1) times , and, when position-measuring calculations have been performed "m" times or more, said statistical processing means outputs a position-measured result having a minimum position-measured error out of measured results obtained from position-measuring operations performed (n−m+1)-th to n-th time ("n" is a natural number being "m" or more).

* * * * *